United States Patent [19]
Ott et al.

[11] Patent Number: 5,187,768
[45] Date of Patent: Feb. 16, 1993

[54] FIBER OPTIC VARIABLE SIGNAL ATTENUATOR

[75] Inventors: Conrad L. Ott, Lake Grove; David E. Wuestmann, Fort Salonga; Louis Maiolo, Lake Ronkonkoma, all of N.Y.

[73] Assignee: Porta Systems Corp., Syosset, N.Y.

[21] Appl. No.: 810,317

[22] Filed: Dec. 19, 1991

[51] Int. Cl.$^5$ .............................................. G02B 6/38
[52] U.S. Cl. ...................................... 385/140; 385/72
[58] Field of Search .................... 385/140, 73, 60, 72

[56] References Cited

U.S. PATENT DOCUMENTS

4,717,234 1/1988 Barlow et al. ................... 385/140
5,050,956 9/1991 Carpenter et al. ................ 385/140
5,066,094 11/1991 Takahashi ........................ 385/140

*Primary Examiner*—John D. Lee
*Assistant Examiner*—John Ngo
*Attorney, Agent, or Firm*—Charles E. Temko

[57] ABSTRACT

A fiber optic connector having an adjustable element providing for optical signal attenuation. The connector includes a pair of plug connector elements maintained in axially aligned relation upon engagement with a medially positioned adapter element. One of the plug connector elements incorporates the adjustable element, movement of which varies the gap existing between the aligned ends of the optical fibers without relative rotation between the end surfaces of the fibers.

4 Claims, 11 Drawing Sheets

FIBER OPTIC VARIABLE SIGNAL ATTENUATOR

BACKGROUND OF THE INVENTION

This invention relates generally to the field of fiber optic signal transmission coupling devices used to interconnect a pair of terminated optical fibers for light transmission therethrough, and more particularly to an improved device of this type incorporating means for varying the gap between the ends of the aligned terminated optical fibers in a controlled manner to provide variable optical attenuation to a transmitted signal. Devices of this general type are known in the art, and the invention lies in specific constructional details permitting improved ease in adjustment, as well as simplification of the manufacture of the component parts and the assembly thereof.

In the prior art, there exist a variety of structures for introducing variable attenuation. Some structures include a wheel having a plurality of neutral density filters which are selectively introduced into the gap. Others employ a movably mounted reflective surface. Still other methods employ heating and twisting of the fibers.

The U.S. Pat. No. 4,145,110 granted Mar. 20, 1979 to Otti Szentesi, discloses a relatively low-cost device to accomplish this purpose in which a connecting structure firmly holds one terminated fiber in relatively fixed position, while varying the other fiber using a threaded nut toward and away from the fixed fiber to vary the distance therebetween. While not without utility, the construction is rather large in overall size, precluding use of the same in an area where space limitations are critical, and the construction employs parts which are not easily manufactured using mass production techniques, such as die castings.

SUMMARY OF THE INVENTION

Briefly stated, the invention contemplates the provision of an improved construction of the type described in which the above-mentioned disadvantages have been substantially eliminated. to this end, the disclosed embodiment is formed, in large part, by a number of die cast or synthetic resinous components which, in assembled condition, resemble a pair of conventional plug connectors and an adapter positioned therebetween. Adjustment is performed by manually rotating a tubular member forming a part of one of the plug connectors which results in the longitudinal displacement of a fiber supporting ferrule on one of the plug connectors with respect to the other, without, in any manner, disturbing the relative angular relation of the fibers, and without, in any manner, effecting any lateral displacement of the axis of either fiber. In keeping with the desired end of obtaining ease of manufacture and relatively simple assembly, the improved structure avoids the use of resilient snap rings or other retaining members, installation of which requires the use of specialized tools or skills. By providing the end surfaces of the finished ends of the fibers which are disposed at a substantial angle with respect to the axis of the fibers optical performance in terms of insertion loss and reflectance is enhanced. The abutted ferrules which support the fibers are disposed in a single alignment sleeve, thus assuring absolute coaxial relationship between the fibers.

BRIEF DESCRIPTION OF THE DRAWINGS

In the drawings, to which reference will be made in the specification, similar reference characters have been employed to designate corresponding parts throughout the several views.

DETAILED DESCRIPTION OF THE DISCLOSED EMBODIMENT

In accordance with the invention, the device, generally indicated by reference character 10 (See FIG. 1) apparently comprises broadly, a first plug connector 11, an adapter element 12, and a second plug connector element 13.

The first plug connector element 11 is threadedly engaged with the adapter element 12, and remains in relatively fixed condition after installation. It includes a main housing 20 bounded by a knurled outer surface 21 and an outer end wall 22 which surrounds a known strain relief extension 23 of PVC or similar material.

The housing mounts a ferrule supporting element 26 in known manner, and includes the usual ferrule retaining member 27 and ferrule 28 having an angularly disposed end face 28a. The use of angled faces on ferrules enables a second feature (in addition to superior reflection performance) in that the axial distance to achieve higher attenuation values is reduced relative to that required when employing a flat-faced ferrule. Thus, the ability to vary attenuation between 0 dB and 40 dB can be achieved within a separation of approximately half the distance required in the case of flat-faced ferrules. The housing also includes a sleeve 29 having a keying projection (not shown) which engages corresponding structure in the adapter element 12 so as to maintain a fixed axial relationship therebetween, again, as is known in the art.

Figure 6:
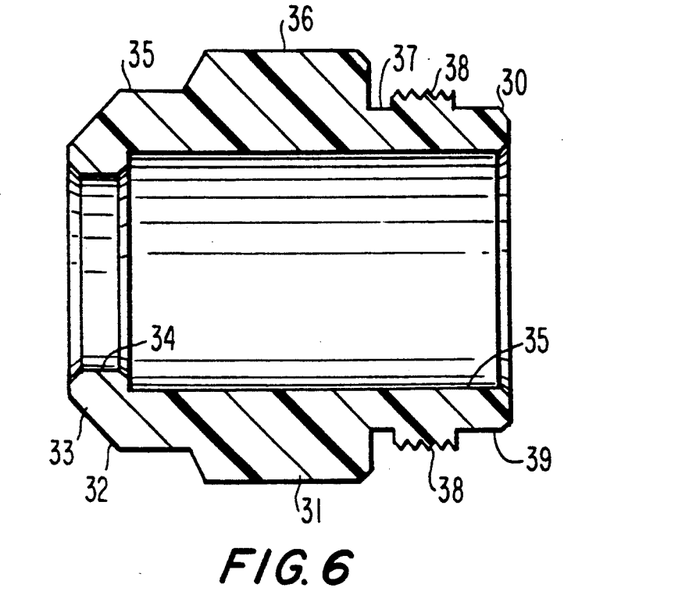
FIG. 6 is a longitudinal central sectional view of a fixed retaining nut forming a part of the disclosed embodiment.
Figure 7:
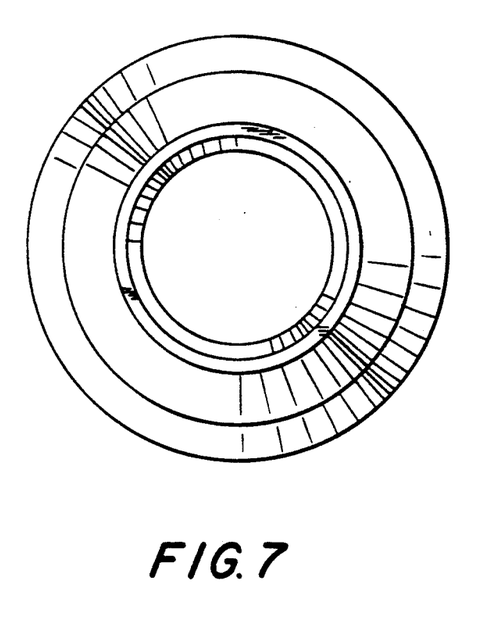
FIG. 7 is an end elevational view thereof.
Figure 16:
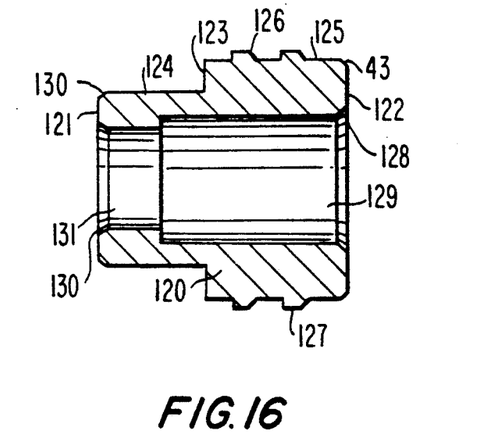
FIG. 16 is a longitudinal sectional view of an adapter bushing.

Surrounding the housing 20 is a fixed retaining nut (FIGS. 6-7) most conveniently formed from a hard synthetic resinous material such as Delrin. It includes an elongated body 31 terminating in an outer end 32 having an orificed end wall 33, forming a bore 34 which surrounds the main housing 20. A first cylindrical surface 35 communicates with a larger diameter surface 36 for convenient manual engagement. A third surface 37 includes a threaded portion 38 and a rabbetted portion 39. The bore 34 communicates with a counter bore 35. A flat gasket 92 is formed of a resilient, high friction material such as silicone rubber. It is bounded by surfaces 93 and 94 and positioned between orificed septum 111 of attenuator block 42 and radially extended surface 89 (FIG. 16) of key alignment bushing 41. The purpose of this component is to resist rotation of the key alignment bushing 41 relative to the attenuator block 42 through compression of the gasket 92 when the element 11 is torque threaded into the block and against a flange 86 of keyed alignment bushing 41 which subsequently applies force to the gasket resulting in the compression and anti-rotational effect.

Figure 8:
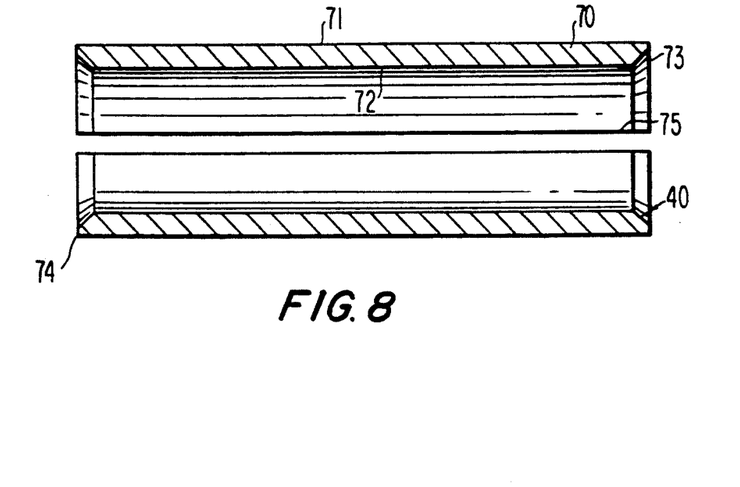
FIG. 8 is a central longitudinal sectional view of a ferrule alignment sleeve.
Figure 9:
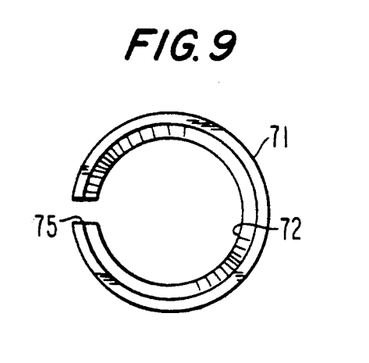
FIG. 9 is an end elevational view thereof.
Figure 10:
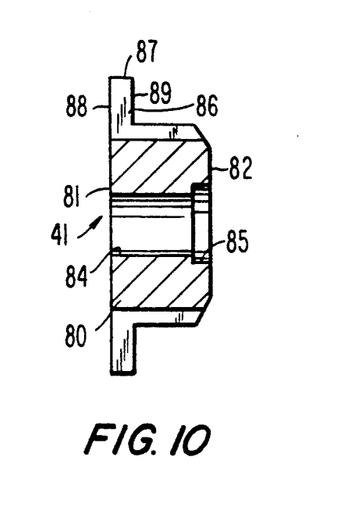
FIG. 10 is a longitudinal central sectional view of a key alignment bushing.
Figure 11:
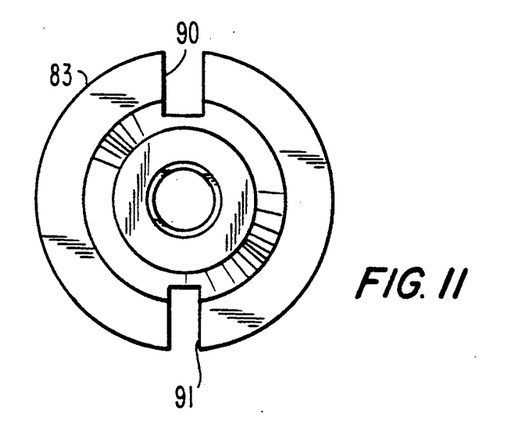
FIG. 11 is an end elevational view thereof as seen from the right-hand portion of FIG. 10.
Figure 12:
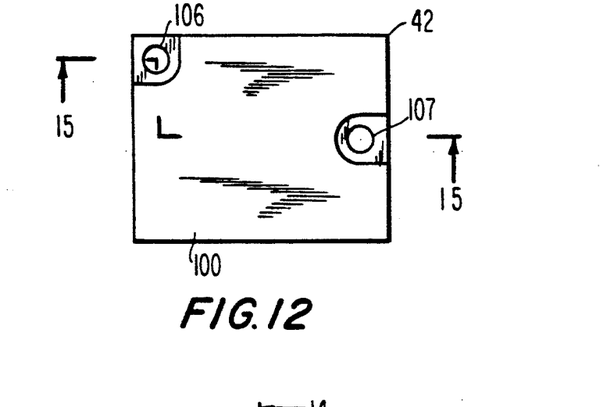
FIG. 12 is a top plan view of an attenuator block.
Figure 13:
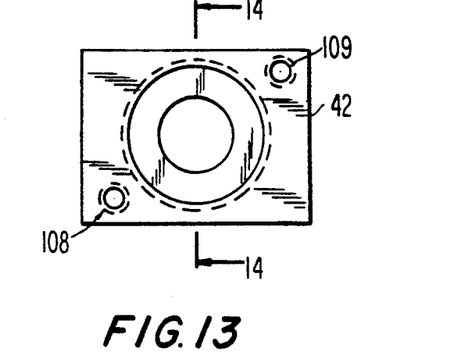
FIG. 13 is an end elevational view thereof as seen from the lower portion of FIG. 12.
Figure 14:
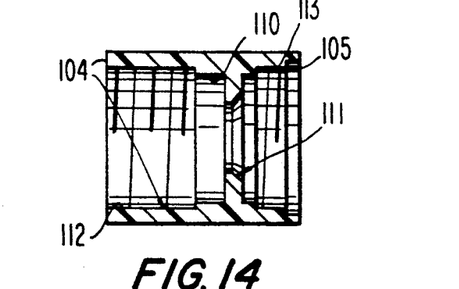
FIG. 14 is a longitudinal sectional view thereof as seen from the plane 14—14 in FIG. 13.
Figure 15:
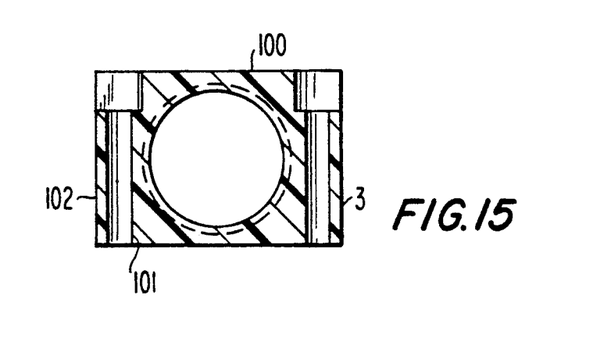
FIG. 15 is an offset sectional view as seen from the plane 15—15 in FIG. 12.
Figure 17:
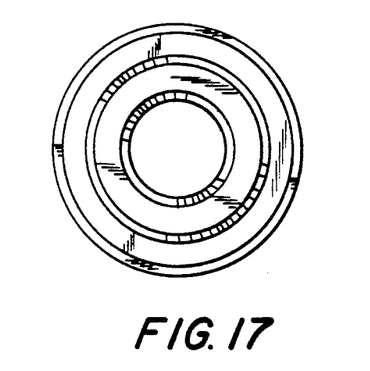
FIG. 17 is an end elevational view thereof as seen from the left-hand portion of FIG. 16.
Figure 18:
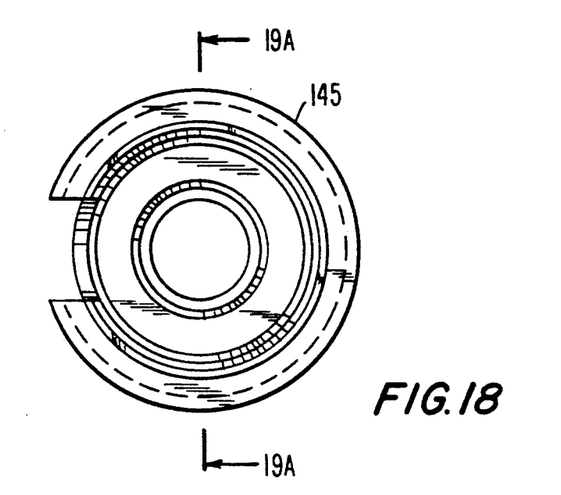
FIG. 18 is an end elevational view of an adapter body element.
Figure 19:
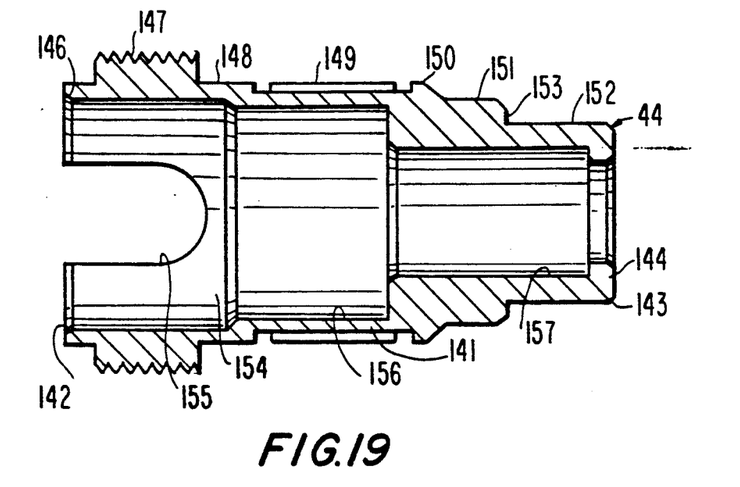
FIG. 19 is a longitudinal central sectional view thereof.
Figure 20:
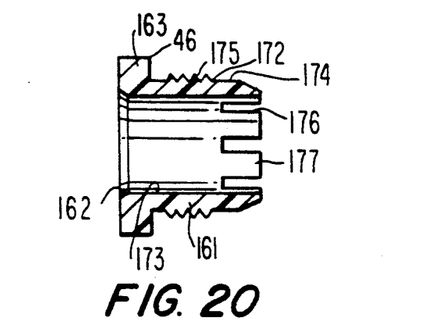
FIG. 20 is a longitudinal central sectional view of a variable retaining nut or collet.
Figure 21:
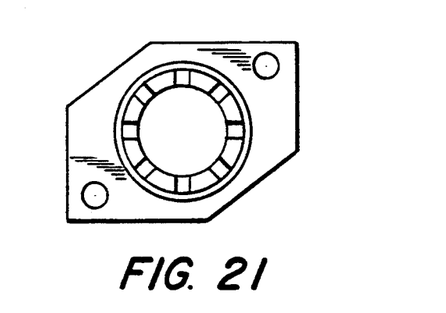
FIG. 21 is an end elevational view thereof.
Figure 22:
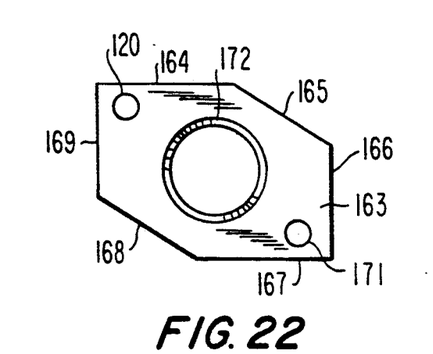
FIG. 22 is an opposite end elevational view thereof.
Figure 23:
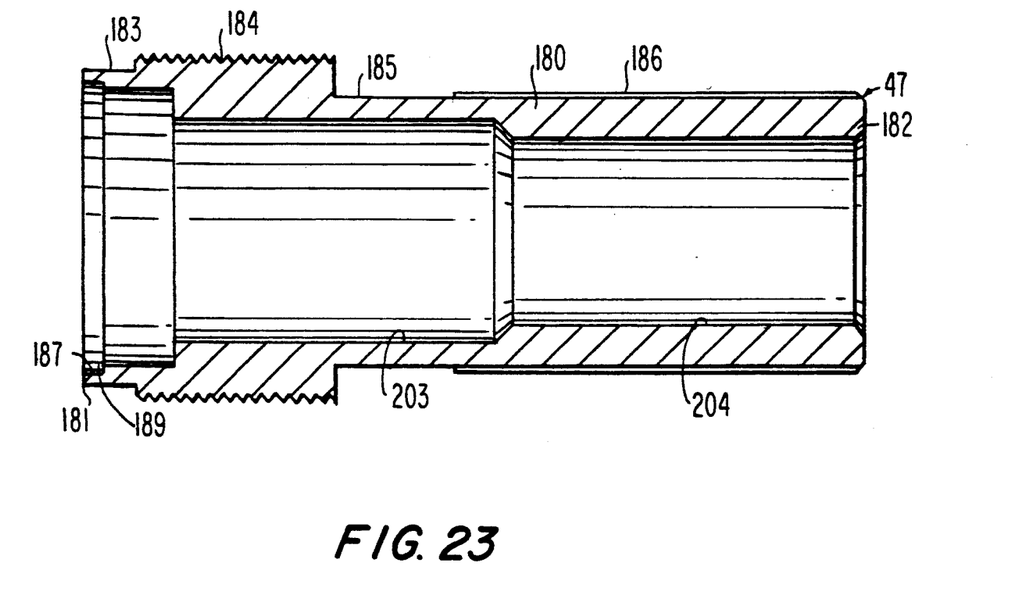
FIG. 23 is a longitudinal central sectional view of a retaining nut.
Figure 24:
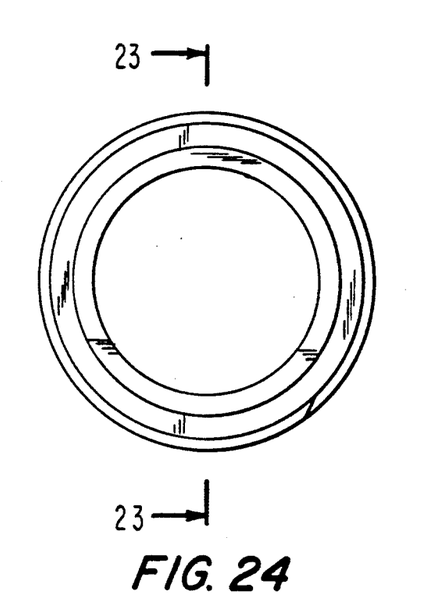
FIG. 24 is an end elevational view thereof.
Figure 25:
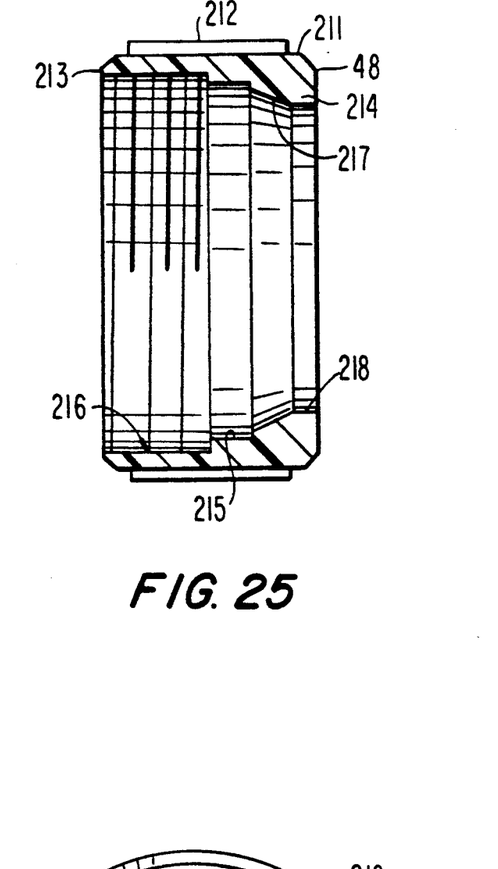
FIG. 25 is a longitudinal central sectional view of a locking nut.
Figure 26:
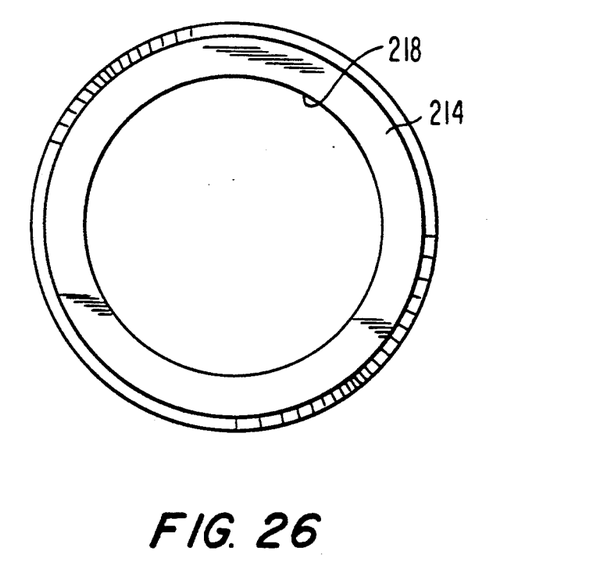
FIG. 26 is an end elevational view thereof as seen from the right-hand portion of FIG. 25.

The adapter element 12 serves to interconnect the plug elements 11 and 13, and includes a ferrule alignment sleeve 40 (FIG. 8), a key alignment bushing 41 (FIGS. 10 and 11), an attenuator block 42 (FIGS. 12 to 15), an adapter bushing 43 (FIGS. 16 and 17), an adapter body 44 (FIGS. 18 and 19) of so-called FC type, a keyed body 45 (FIGS. 4 and 5), a restrainer or collet element 46 (FIGS. 20-22), a variable retaining nut 47 (FIGS. 23 and 24), and a corresponding locking nut 48 (FIGS. 25 and 26).

Figure 4:
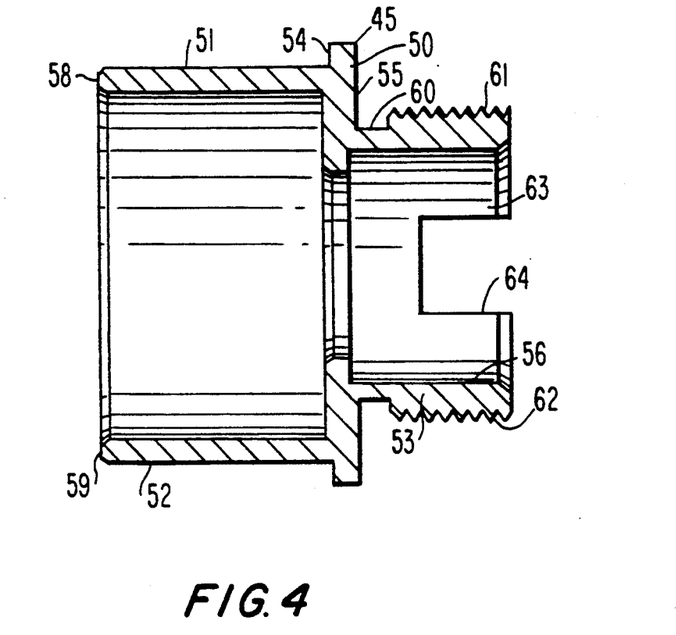
FIG. 4 is a longitudinal central sectional view of a keyed body member forming a part of the embodiment.
Figure 5:
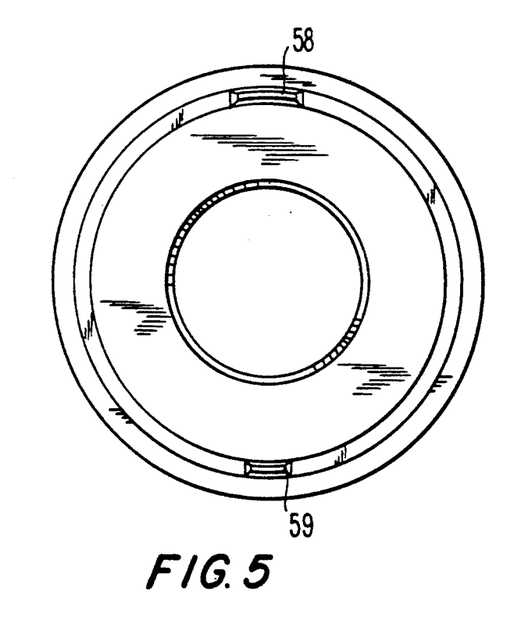
FIG. 5 is an end elevational view thereof as seen from the left-hand portion of FIG. 4.

Referring to FIG. 4, the keyed body 45 serves to prevent externally applied rotational motion to result in rotational movement of the ferrule of the second plug connector element 13. Because of its relatively complicated configuration, it is most conveniently formed from machined brass alloy. It includes a flanged centrally disposed member 50 from which first and second key projections 51 and 52 extend to one side thereof, and a cylindrical sleeve 53 which extends from an opposite side. The member 50 is bounded by first and second radially-extending surfaces 54 and 55 between which a centrally disposed bore 56 extends. The key projections 51 and 52 are of different arcuate widths to facilitate indexing, each having a chamfered terminal 58 and 59 to facilitate engagement. The sleeve 53 is bounded by an outer surface 60 having a threaded portion 61 and an end edge chamfered surface 62 which leads to a bore 63. The sleeve 53 also includes a rectangularly-shaped slot 64 which serves a keying function with respect to the plug connector element 13.

The ferrules of the first and second plug connector elements are stably maintained in axial and concentric alignment so as to resist environmental extremes (such as thermal shifts and vibration).

The ferrule alignment sleeve 40 (FIG. 8) serves to engage the ferrule on each of the first and second plug elements and maintain axial alignment therebetween. It is most suitably formed as a beryllium copper elongated body 70 bounded by an outer surface 71 and an inner surface 72 extending between first and second chamfered ends 73 and 74. A longitudinal slot 75 permits resilient radial expansion and contraction. The alignment sleeve which is positioned within the adapter element is precisely machined, and heat treated to obtain maximum spring characteristics. The ferrules are frictionally engaged within this common alignment sleeve, thus, the concentricity between the transmitted fibers (within the ferrules) and the outside diameter of both ferrules relative to each other is maintained. The spring characteristics of the heat treated Beryllium copper assure retention of the interference fit during axial movement of the varying ferrule within the second plug. In addition, the key projections of the keyed body 45 are dimensioned to provide an interference fit relative to the slots of the key alignment bushing 41. The use of teflon for this bushing stems from the inherent stable resilience and low coefficient of friction of this material, such that the key projections can slide within slots repeatedly without variation in rotational movement.

The key alignment bushing 41 (FIGS. 10 and 11) includes a cylindrical body 80 terminating in first and second end surfaces 81 and 82 between which an outer surface 83 extends. A centrally disposed bore 84 communicates with a short counter bore 85. Extending radially from the first end surface 81 is a flange 86 bounded by a peripheral surface 87 and first and second radially extended surfaces 88 and 89. A relatively wider rectangular slot 90 is disposed directly opposite a relatively narrow rectangular slot 91.

The attenuator block 42 (FIGS. 12 to 15) constitutes a principal housing for the adapter element 12 and may be formed from Delrin. It is generally rectangular in configuration, being bounded by an upper surface 100, a lower surface 101, first and second side surfaces 102 and 103, and first and second end surfaces 10 and 105. First and second mounting bores 106 and 107 are engaged by threaded means (not shown). Threaded bores 108 and 109 have axes which are at right angles to the bores 106 and 107, and serve to mount the restrainer 46 as will more clearly appear hereinafter. A centrally disposed bore 110 includes an orificed septum 111 separating first and second threaded segments 112 and 113.

The adapter bushing 43 (FIGS. 16 and 17) is preferably formed of a relatively hard brass alloy, and comprises a cylindrical body 120 bounded by first and second end surfaces 121 and 122, a radial surface 123, a first outer surface 124, and a second outer surface 125. The surface 125 is provided with friction fit ribs 126 and 127, and terminates in a chamfered edge 128 adjacent a counter bore 129. At the opposite end, a chamfered edge 130 leads to a bore 131.

The adapter body 44 (FIGS. 18 and 19) is also made of brass alloy, and includes a cylindrical body 141 extending between a larger end 142 and a smaller end 143 having an orificed end wall 144. An outer surface 145 includes a first end segment 146, a second threaded segment 147, a third segment 148, including a knurled portion 149, a radially-extending rib 150, a fourth segment 151 and a fifth segment 152 separated by a radially-extending surface 153. The function of the knurled portion 149 is to frictionally engage the centrally disposed bore 84 of the key alignment bushing 41 so as to prevent rotation of the bushing relative to the adapter body 44. Extending axially are a first relatively larger bore 154 including an alignment slot 155, a second bore 156, and a third bore 157, all of which engage the first plug element 11 upon assembly.

The restrainer or collet element 46 (FIGS. 20 to 22) is secured to a surface of the attenuator block 42, and is formed from Delrin. It includes an elongated body 161 communicating at a first end 162 with a non-circular flange 163 bounded by sides 164, 165, 166, 167, 168 and 169. Mounting holes 170 and 171 align with corresponding bores in the block 42. A cylindrical sleeve 172 encloses a through bore 173. An outer cylindrical surface 174 includes a threaded segment 175. Slots 176 form flexible tapered flanges 177 which act as a collet.

Figure 3:
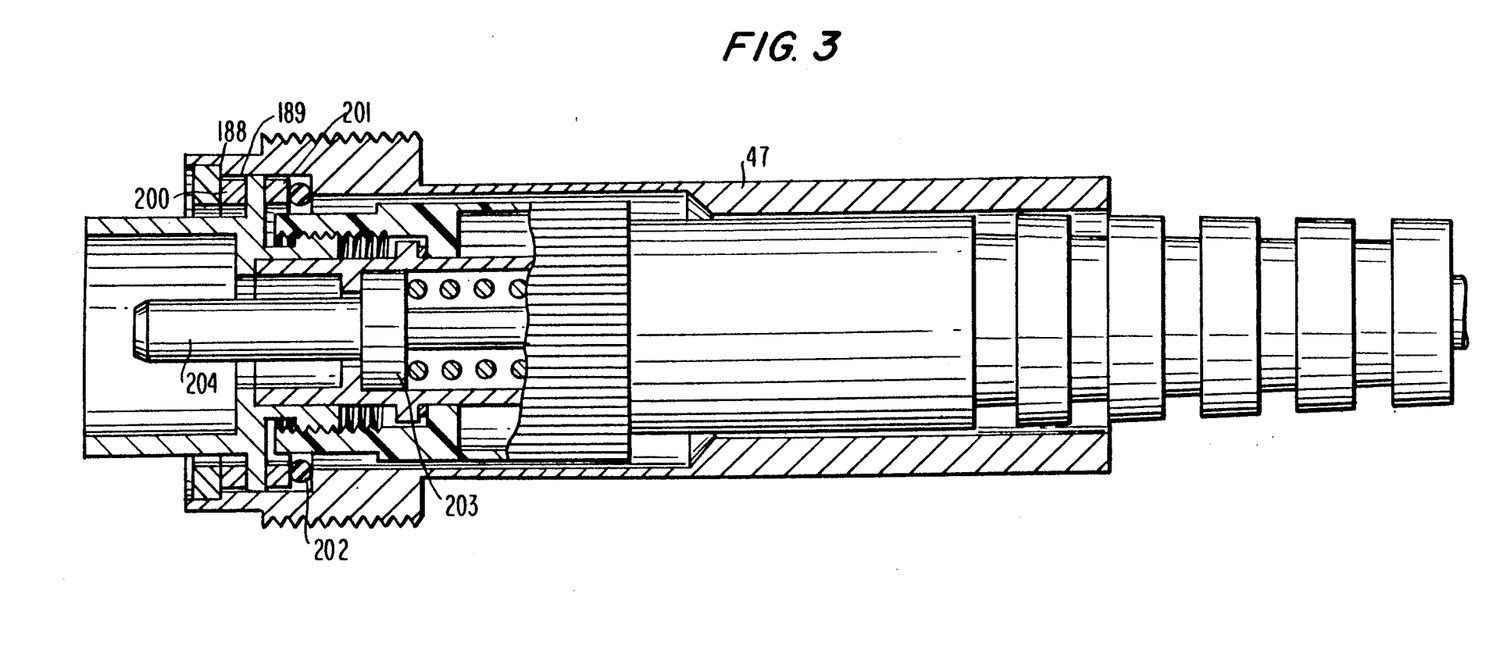
FIG. 3 is a longitudinal central sectional view of a sub-assembly showing a plug connector element incorporating adjustment means.

The variable retaining nut 47 (FIGS. 23 and 24) is preferably formed of aluminum alloy to provide a non-resilient surface and conserve weight. It is adjustably engaged by the restrainer 46 to maintain a given adjustment. It includes a cylindrical body 180 extending between an inner end 181 and an outer end 182. It is bounded by a first outer surface 183, a second threaded surface 184, and a third outer surface 85, including a knurled segment 186. A first bore 187 accommodates a bushing 188 (See FIG. 3), and a communicating second bore 189 accommodates first and second low friction washers 200 and 201, the flange 54 of keyed body 45, and a resilient O-ring 202. The purpose of the O-ring is to enable its compression so as to maintain stability of axial movement during rotation of the variable nut 47. By contrast, the purpose of the low friction washers 200 and 201 is to allow rotation of variable nut 47 without undue friction between the keyed body flange and the rotating surfaces of the variable retaining nut 47. The silicone rubber O-ring within the variable nut assembly is compressed due to the dimensional design of the nut counterbore depth and the relatively longer corresponding accumulated length of the O-ring, low friction washers, and keyed body flange. When the bushing 188 is pressed into the variable nut counterbore 187, the O-ring is compressed and the result is the elimination of axial motion between the variable nut and the keyed body as well as the second plug element due to the fact that the plug element is threadedly engaged with the keyed body. The low friction washers placed on both sides of the keyed body flange enable the variable nut to rotate during attenuation setting without effecting rotational force against the keyed boy due to the contact of the keyed body with the high frictional surface of the compressed O-ring. A third elongated bore 203 communicates with a fourth bore 204 which extends to the outer end 182. The bore 263 supports fiber 28b having an angularly disposed end face 28c corresponding to the face 28a.

The locking nut 48 (FIGS. 25 and 26) is also formed from Delrin, and includes a cylindrical body 211 bounded by an outer knurled surface 212 extending between inner and outer end surfaces 213 and 214. A first bore 215 includes a threaded segment 216 leading to a conical bore 217 and a second bore 218.

Figure 1:
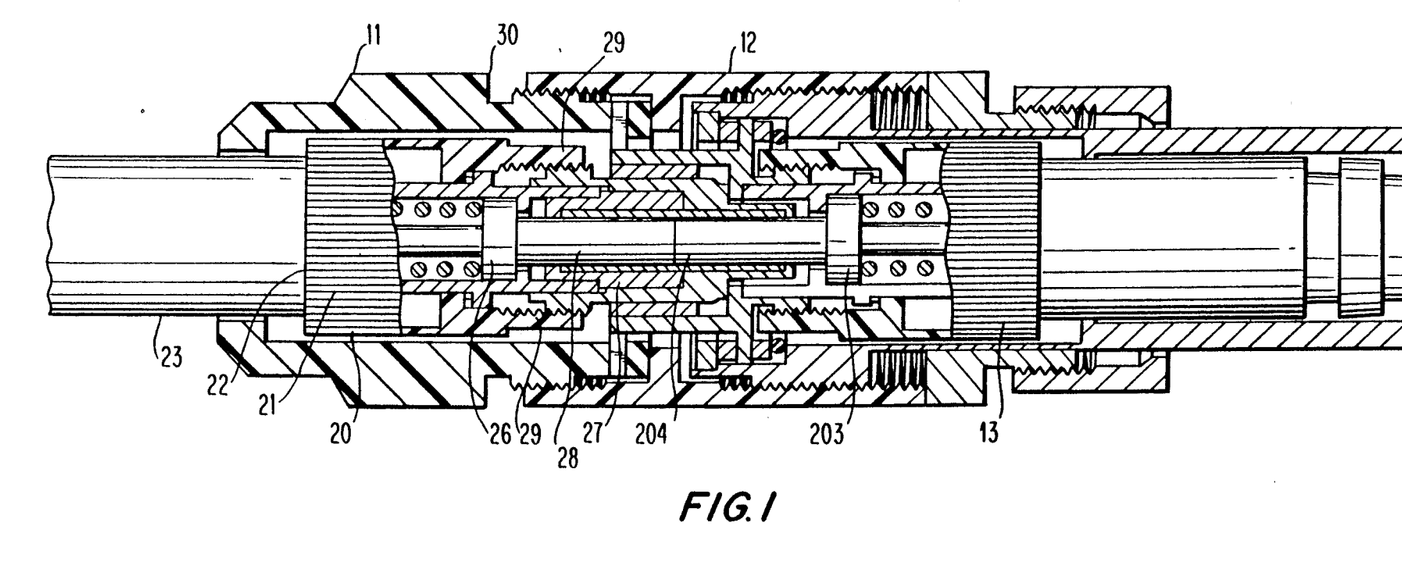
FIG. 1 is a longitudinal central sectional view of an embodiment of the invention.
Figure 2:
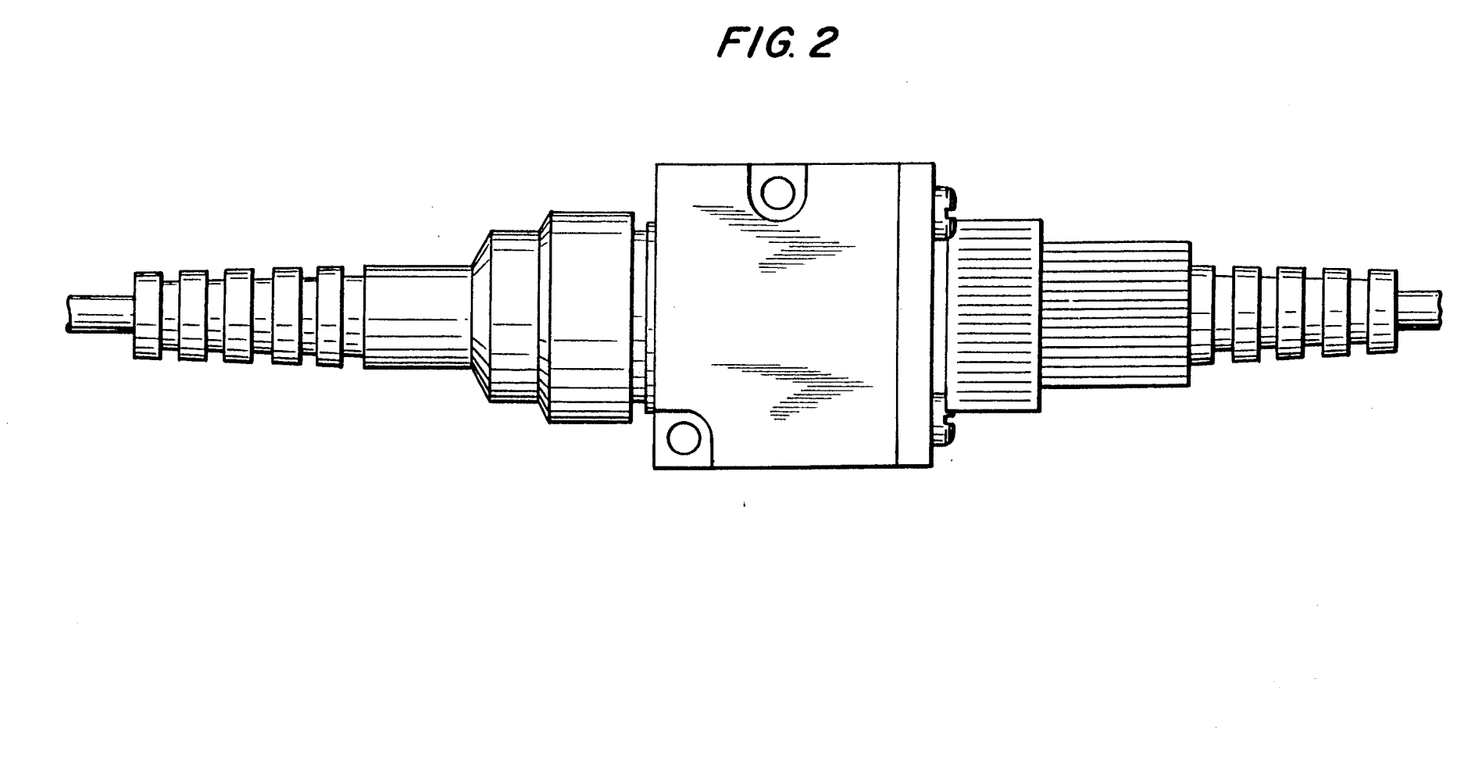
FIG. 2 is a corresponding side elevational view thereof.

The second plug element 13 (FIG. 3) also includes parts corresponding to the first plug element 11 which remains relatively fixed to the keyed body 45 after connection therewith. However, in the case of the second plug element, it is actually shifted during adjustment relative to the first plug element by rotating the variable retaining nut 47 within the attenuator block 42. FIG. 1 illustrates the relative position of the above-described parts after assembly.

FIG. 1 also illustrates the ferrules of the first and second plug elements in substantially abutted condition wherein minimum optical attenuation is obtained. Where greater attenuation is required, the nut 48 is loosened relative to the element 46 permitting rotation of the variable retaining nut 47, the inner end of which is threaded to the block 42. With rotation, axial motion is transmitted to the keyed body 45 (FIG. 4) which communicates with the ferrule supporting element 203. The frictional engagement of the key projections of the keyed body 45 within the rectangular slots of the key alignment bushing 41 enable a smooth, stable, axial movement without rotation. The differing widths of the key projections of the keyed body 45 correspond with the differing widths of the rectangular slots of the key alignment bushing 41 so as to facilitate proper orientation during assembly. Normally, the nut 47 will be rotated in relatively small increments with a test of light transmission being performed between these increments until the desired degree of attenuation is obtained. At this point, the locking nut 48 is again tightened to activate the restrainer element 46 to secure the adjustment. As the block 42 is normally fixed, this adjustment is essentially a one-handed operation.

It will be observed that the abutting ends of the ferrules 28 and 28a are disposed at an acute angle with respect to the common longitudinal axis of the ferrules, as is known in the art, for the purpose of reducing reflection loss of transmitted light beams. It is to be noted that during adjustment for attenuation, the relative parallel relationship of the abutting faces is not disturbed as the distance between the surfaces is varied, and that this relationship is stably maintained by use of a frictional fit between the key projections of the keyed body into rectangular slots in the keyed alignment bushing and the compression of the O-ring within the variable retaining nut. Both features assure that the angular and concentric relationship between the angled faces of the transmitting fibers within the alignment bushing are maintained during axial separation and during exposure to thermal environmental shifts and vibration.

It may thus be seen that we have invented novel and highly useful improvements in a fiber optic variable signal attenuator in which means is provided not only for the relative axial displacement of abutting ferrules, but means for positively locking a desired degree of adjustment as well, the structure operating in a manner similar to that of a miniature collet. The superior optical performance, with respect to both insertion loss and reflection, is achieved and maintained during attenuation shifts and environmental changes. Many of the component parts may be formed as synthetic resinous moldings, and the required threading operations may, in many cases, be performed as screw machine operations. As distinguished from prior art devices of the disclosed type, adjustment is made by shifting the relative positions of fiber supporting ferrules rather than shifting the abutting optical cables enclosing the optical fibers.

We wish it to be understood that we do not consider the invention to be limited to the precise details of structure shown and set forth in the specification, for obvious modifications will occur to those skilled in the art to which the invention pertains.

We claim:

1. An improved fiber optic variable signal attenuator comprising: first and second plug connector elements and an adapter element selectively interconnecting said plug connector elements in axially aligned relation; each of said first and second connector plug elements including a ferrule mounting a finished end of an optical fiber such that such finished ends are maintained in mutually aligned relation; said second plug element including a first means threadedly engaging corresponding second threaded means on said adapter element, relative movement therebetween resulting in relative axial movement between ferrules of said plug connector elements to vary the distance between said finished ends of said optical fibers; and means for selectively clamping said first means in adjusted position relative to said adapter element, said means for selectively clamping being in the form of a collet surrounding said first means; means for preventing relative rotational movement between said first and second plug connector elements during the occurrence of relative axial movement therebetween, said means including a keyed body, keyed projections on said first and second plug elements, said keyed body and adapter element defining rectangularly-shaped slots slideably engaging said projections; and a keyed alignment bushing defining rectilinear slots slideably engaging said keyed projections on said keyed body.

2. An improved attenuator in accordance with claim 1, said keyed body element including a radially-extending flange supported within a bore in said connector element, said bore supporting a pair of low friction washers on either side of said flange in compressed relationship, thereby permitting rotation of said keyed body element only within a fixed plane relative to said adapter element.

3. An improved attenuator in accordance with claim 2, said first and second threaded means including a planar high friction gasket positioned between said first plug connector element and said adapter element, said gasket being compressed between said adapter element and said first threaded means to prevent relative rotation therebetween as said second plug element is axially adjusted relative to said adapter element.

4. An improved attenuator in accordance with claim 1 in which said slots and projections are of differing and corresponding widths to enable engagement therebetween in only a single relative orientation to thereby assure proper relative positioning of the angled end faces of said finished ends of said optical fibers.

* * * * *